Patented May 23, 1933

1,910,690

UNITED STATES PATENT OFFICE

IVAN GUBELMANN AND JOSEPH B. OESCH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

AZO DYESTUFFS AND PROCESS OF PREPARING THE SAME

No Drawing.   Application filed July 17, 1929.   Serial No. 379,066.

This invention relates to azo dyestuffs and to a process of preparing the same.

It is an object of this invention to provide a process for the preparation of novel dyestuffs which may be used for dyeing animal fibers and in particular wool, and which are generally characterized by their bright shades, good fastness to fulling and to light. The dyestuffs of our invention have the additional property of changing shade but little as a result of after-chroming; the shade, however, becomes more intense and duller.

Other and further important objects of this invention will become apparent from the following description and appended claims.

We have now found that valuable dyestuffs may be prepared by diazotizing amino-benzyl-ortho-benzoic acids in which the amino group is attached to the ring of the nucleus not containing the ortho carboxyl substituent. The preferred dyestuffs of this type are formed by coupling to an azo component a diazo compound of the following general formula:

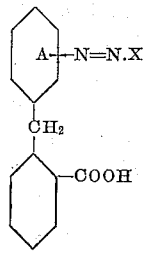

wherein the benzyl nucleus A may be further substituted and wherein X represents an inorganic acid residue, such as Cl, HSO$_4$ or the like.

The dyestuffs may be represented by the following formula:

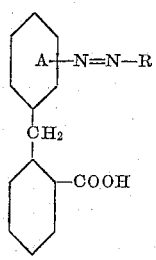

in which R is the residue of a coupling component and in which the benzene ring A may be further substituted.

The processes for preparing the intermediates from which the diazo components are derived are described in copending applications of Gubelmann et al. Serial No. 290,027, No. 290,028 and No. 329,946. In the more specific form of our invention we prefer the use of an amino-benzyl-ortho-benzoic acid of the following type:

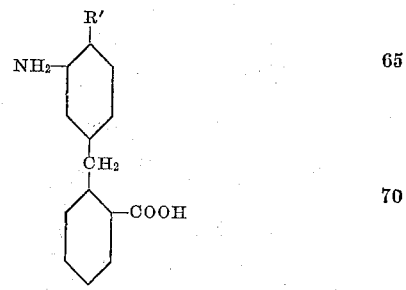

wherein R' represents a hydrogen, halogen, alkoxy, methyl, sulfonic acid group or the like, since we have found that the azo dyestuffs prepared by coupling the diazo compound derived from an amine of this type have exceedingly valuable and distinctive properties.

In the following examples there are described various ways of carrying out the invention in its preferred form. The proportions are in parts by weight.

Example 1

25.7 parts of 3'-amino-4'-methoxy-benzyl-ortho-benzoic acid are dissolved in 260 parts of hot water and 4 parts of caustic soda are added. The mass is cooled to about 0° C. and 6.9 parts of sodium nitrite are added. There are then added 36 parts of hydrochloric acid (20° Bé.). The mixture is stirred for about 15 minutes.

The diazo solution prepared as above is added to a solution prepared by dissolving 25.3 parts of the monosodium salt of N.W.

acid (1-hydroxy-naphthalene-4-sulfonic acid) in 250 parts of water and adding 33 parts of soda ash. The coupling is made at about 0 to 5° C. After stirring the reaction mass for about 1 hour, 120 parts of common salt are added and the dyestuffs that is thus salted out is filtered off and dried. The product obtained dyes wool in bright red shades, having excellent fastness to light and to fulling. Upon chroming, the shade is changed but slightly, becoming somewhat deeper in color.

*Example 2*

The diazo solution prepared as described in Example 1 is added to a solution of the sodium salt of acetyl J-acid (2-acetylamino-5-hydroxy-naphthalene-7-sulfonic acid), prepared by dissolving 32.8 parts of the sodium salt of acetyl-J-acid (molecular weight—303.5) in 350 parts of water and adding 33 parts of soda ash. The coupling is carried out at a temperature of 0 to 5° C. The resulting product is then salted out and dried. It dyes wool a bright yellowish-red, having excellent fastness to light and good fastness to fulling. Upon after-chroming the shade is changed but slightly, becoming somewhat deeper in color.

*Example 3*

The diazo solution prepared as described in Example 1 is added to a solution of 2′,5′-dichloro-4′-sulfo-phenyl-3-methyl-5-pyrazolone, prepared by dissolving 33.9 parts of the above pyrazolone (molecular weight—323) in 200 parts of water containing 4 parts of caustic soda and thereafter adding 33 parts of soda ash. The coupling is carried out at 0 to 5° C. The resulting product is then salted out, filtered off and dried. It dyes wool in bright golden yellow shades of excellent fastness to light and fulling. Upon after-chroming the shade is changed but slightly, becoming somewhat deeper in color.

We have prepared other dyestuffs than the above by similar processes, coupling the following components;

|  | Diazo compound derived from | Coupling component | Shade on wool |
|---|---|---|---|
| 1 | 3′-amino-4′-methoxy-benzyl-ortho-benzoic acid | 2-phenylamino-5-naphthol-7-sulfonic acid | Reddish brown |
| 2 | Do. | 1-acetylamino-8-naphthol-3,6-disulfonic acid | Reddish violet |
| 3 | Do. | 2-acetylamino-8-naphthol-6-sulfonic acid | Dull red |
| 4 | Do. | 2-naphthol-6-sulfonic acid | Yellowish red |
| 5 | Do. | 2-naphthol-7-sulfonic acid | Scarlet |
| 6 | Do. | 1-naphthol-5-sulfonic acid | Bluish red |
| 7 | 3′-amino-4′-methoxy-benzyl-ortho-benzoic acid | 1-naphthol-3-sulfonic acid | Scarlet |
| 8 | Do. | 2-naphthol-6,8-disulfonic acid | Yellowish red |
| 9 | Do. | Beta-naphthol | Red |
| 10 | Do. | 2-aminonaphthalene-6-sulfonic acid | Yellowish orange |
| 11 | Do. | 2-naphthol-3,6-disulfonic acid | Bluish pink |
| 12 | Do. | 1,5-dihydroxy-naphthalene | Bordeaux |
| 13 | Do. | 1-p-tolylamino-naphthalene-8-sulfonic acid | Bordeaux |
| 14 | 3′-amino-4′-chloro-benzyl-ortho-benzoic acid | 1-naphthol-4-sulfonic acid | Reddish orange |
| 15 | Do. | 1-naphthol-3,8-disulfonic acid | Reddish orange |
| 16 | Do. | 2′,5′-dichlor-4′-sulfophenyl-3-methyl-5-pyrazolone | Greenish-yellow |
| 17 | 3′-amino-4′-sulfobenzyl-ortho-benzoic acid | 1-naphthol-4-sulfonic acid | Reddish orange |
| 18 | Do. | 2-amino-8-naphthol-6-sulfonic acid (coupled in alkaline solution) | Reddish-brown |
| 19 | Do. | 2′,5′-dichloro-4′-sulfo-phenyl-3-methyl-5-pyrazolone | Yellow |
| 20 | 3′-amino-4′-methoxy-6′-chlorobenzyl-ortho-benzoic acid | 1-naphthol-4-sulfonic acid | Bluish red |
| 21 | Do. | 1-naphthol-5-sulfonic acid | Bluish red |
| 22 | Do. | 1-naphthol-3,8-disulfonic acid | Red |
| 23 | Do. | Beta-naphthol | Red (sparingly soluble) |
| 24 | Do. | 2-phenylamino-8-naphthol-6-sulfonic acid | Brown |
| 25 | Do. | 2′,5′-dichloro-4′-sulfo-3-methyl-5-pyrazolone | Reddish yellow |

In addition to the above diazo components other amino-benzyl-ortho-benzoic acids, such as those disclosed in the copending application, Serial No. 290,027, No. 290,028 both filed July 2, 1928, and 329,946, filed January 2, 1929, have been used with the above coupling components. Amino carboxy benzyl ortho benzoic acids are specifically described in Serial No. 290,027. Similarly other coupling components such as the known halogenated phenyl-methyl-pyrazolone derivatives have been coupled with these diazo bodies.

In the claims below, it should be understood that where new products, dyestuffs, or articles of manufacture are claimed, we mean to include these bodies not only in substance, but also in whatever state they exist when applied to material dyed, printed, or pigmented therewith.

We are aware that numerous details of the process may be varied through a wide range without departing from the principles of this invention, and we, therefore, do not purpose limiting the patent granted hereon otherwise than necessitated by the prior art.

We claim as our invention:

1. Azo dyestuffs of the following general formula:

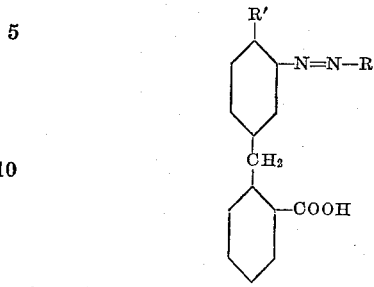

in which R' represents a hydrogen, halogen, alkoxy, methyl, or sulfonic acid group and in which R is the residue of any coupling component.

2. Azo dyestuffs of the following general formula:

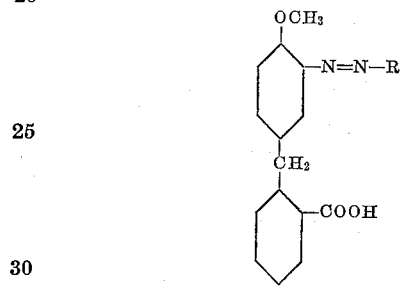

in which R is the residue of any coupling component.

3. An azo dyestuff having as its first or diazo component an amino-benzyl-ortho-benzoic acid body, in which the amino group is attached to the nucleus not containing the ortho carboxyl substituent.

4. The process of preparing azo dyestuffs which comprises coupling a diazo body of the following formula:

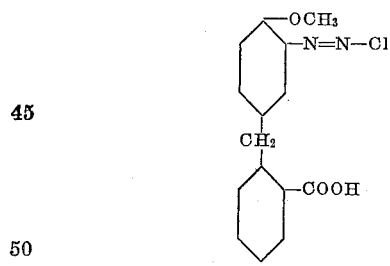

with the monosodium salt of 1-hydroxy naphthalene-4-sulfonic acid.

5. As a new article of manufacture, an azo dyestuff, which, in the form of its free acid has the following formula:

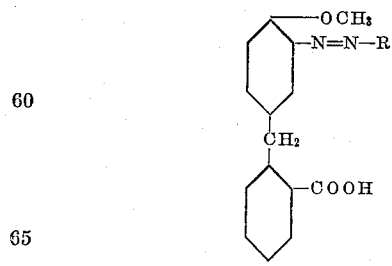

in which R is the residue of 1-hydroxy naphthalene-4-sulfonic acid.

6. The process of preparing azo dyestuffs which comprises coupling a diazo body of the following formula:

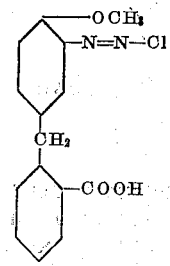

with the sodium salt of 2-acetyl amino-5-hydroxy naphthalene-7-sulfonic acid.

7. An azo dyestuff, which, in the form of its free acid has the following formula:

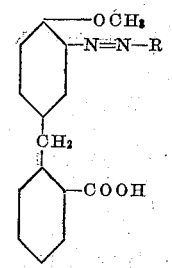

in which R is the residue of 2-acetyl amino-5-hydroxy naphthalene-7-sulfonic acid.

8. The process of preparing azo dyestuffs which comprises coupling a diazo body of the following formula:

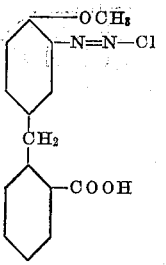

with 2',5'-dichloro-4'-sulfo-phenyl-3-methyl-5-pyrazolone.

9. An azo dyestuff, which, in the form of its free acid has the following formula:

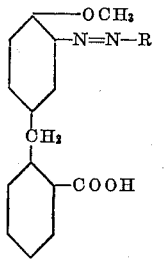

in which R is the residue of 2',5'-dichloro-4'-sulfo-phenyl-3-methyl-5-pyrazolone.

10. The process of producing azo dyestuffs, which comprises coupling a diazo body of the following general formula:

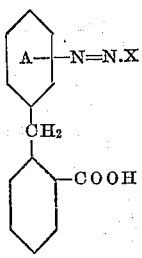

in which the nucleus A may be further substituted with a member of the group consisting of halogen, alkoxy, alkyl, carboxy and sulfonic acid groups and wherein X represents an inorganic acid residue, to an azo component.

11. Azo dyestuffs of the following general formula:

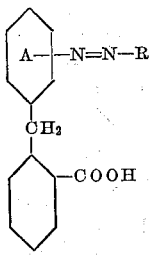

in which the nucleus A may be further substituted with a member of the group consisting of halogen, alkoxy, alkyl, carboxy and sulfonic acid groups and in which R is the residue of any coupling component.

In testimony whereof we have hereunto subscribed our names at Carrollville, county of Milwaukee, Wisconsin.

IVAN GUBELMANN.
JOSEPH B. OESCH.